United States Patent
Lauer et al.

(10) Patent No.: US 8,482,425 B2
(45) Date of Patent: Jul. 9, 2013

(54) CELL PHONE DETECTOR FOR WASHING MACHINES

(75) Inventors: Carl J. Lauer, Santa Barbara, CA (US); Mark A. Lauer, Pleasanton, CA (US)

(73) Assignee: LG Electronics, Inc., Seoul (KR)

( * ) Notice: Subject to any disclaimer, the term of this patent is extended or adjusted under 35 U.S.C. 154(b) by 326 days.

(21) Appl. No.: 13/057,717

(22) PCT Filed: Aug. 3, 2009

(86) PCT No.: PCT/US2009/052586
§ 371 (c)(1),
(2), (4) Date: Mar. 11, 2011

(87) PCT Pub. No.: WO2010/017138
PCT Pub. Date: Feb. 11, 2010

(65) Prior Publication Data
US 2011/0156899 A1     Jun. 30, 2011

Related U.S. Application Data

(60) Provisional application No. 61/087,352, filed on Aug. 8, 2008.

(51) Int. Cl.
*G08B 1/08* (2006.01)
*G08B 21/00* (2006.01)

(52) U.S. Cl.
USPC ............... 340/686.6; 340/539.1; 340/539.11; 340/539.13

(58) Field of Classification Search
None
See application file for complete search history.

(56) References Cited

U.S. PATENT DOCUMENTS

| | | |
|---|---|---|
| 6,222,458 B1 | 4/2001 | Harris |
| 6,490,455 B1 | 12/2002 | Park et al. |
| 6,580,372 B1 | 6/2003 | Harris |
| 6,907,252 B2 | 6/2005 | Papadias et al. |
| 2003/0143954 A1 | 7/2003 | Dettinger et al. |
| 2007/0261713 A1 | 11/2007 | Choi et al. |
| 2008/0074262 A1 | 3/2008 | Paulkovich |
| 2011/0080300 A1* | 4/2011 | Bequette et al. ........... 340/686.6 |
| 2011/0297831 A1* | 12/2011 | Yao et al. .................. 250/338.4 |

FOREIGN PATENT DOCUMENTS

| | | |
|---|---|---|
| CN | 1961111 | 5/2007 |
| WO | 2006-009375 | 1/2006 |

OTHER PUBLICATIONS

"Cell Phone Cellular Bracelet." As Seen on TV. Downloaded from http://www.seenontvproducts.net/cellphonebracelet/index.html. Downloaded Aug. 1, 2007. 4 pages.
"Cell Phone Cellular Pen." As Seen on TV. Downloaded from http://www.seenontvproducts.net/cellphonepen/index.html. Downloaded Aug. 1, 2007. 4 pages.

* cited by examiner

*Primary Examiner* — Julie Lieu
(74) *Attorney, Agent, or Firm* — Mark Lauer; Silicon Edge Law Group LLP (57) ABSTRACT

An apparatus is disclosed comprising: a clothes washing machine (30); a detector (33, 44) attached to the washing machine in a location that receives radio frequency (RF) signals that emanate from an interior (48) of the washing machine; and a warning device (35) that receives a signal from the detector to provide an alert when the detector has detected a RF signal from the interior of the washing machine, wherein the radio frequency signals have a frequency in a band designated for mobile phone (40) signals.

43 Claims, 4 Drawing Sheets

CELL PHONE DETECTOR FOR WASHING MACHINES

BACKGROUND

As technology and living standards advance, cell phones as well as washing machines have become nearly ubiquitous in the modern world. Unfortunately, sometimes the two interact with the cell phone coming out the loser. That is, cell phones or other mobile electronic devices can be carried in clothing that finds its way into a washing machine, and often the devices are destroyed by washing.

With the increasing sophistication of mobile electronic devices, which is often accompanied by a reduction in size and increase in price, the problem of damage to such devices may be increasing. For example, some cell phones or digital assistants can cost more than $500, approaching the cost of a washing machine. In addition, such electronic devices may contain data that may also be lost, which can have a value far exceeding the cost of a new device.

The extent of the problem and the need for a solution can be evidenced by an internet search using the terms "cell phone" and "washing machine" or searching similar terms. A Google® search using the aforementioned terms yields hundreds of thousands of "hits," with titles like: "Save your wet cell phone"; "If your cell phone goes through the washing machine, is it possible to get it to come back to life?"; "Parent Pundit: Having a Teenager=Washing a Cell Phone: What to Do?"; "Digg—Did your cellphone get wet? Throw it in the oven."; etc. In fact, one of those web pages (http://www.water-in-cellphone.com/index/tub.htm) states: "It has been estimated that about 2,160 different people put their cell phone through the wash in a single day."

The solutions offered by such Internet pages, which attempt to fix a cell phone that has become wet, do not address the underlying problem of keeping a cell phone or other mobile electronic device from being damaged in a washing machine in the first place. Nor do they offer any guarantee of success.

There are probably many reasons for the lack of any real solution to the problem of having a valuable electronic device destroyed by a washing machine. One reason, alluded to above, is simply the small size and convenience of the devices, which may be hidden in clothing with a good chance of being undetected. Another reason may be the difficulty of signaling from inside a washing machine to the outside world, if such signaling were to somehow be attempted. Moreover, attempting to place an electronic device detector inside a washing machine would seem to suffer from the same fate as the afflicted cell phones: destruction due to the washing of the washing machine. Another complicating factor is that there may be other electronic devices in the area, but not in the washing machine, which could falsely trigger an alarm. Additionally, a detector which incorporates active signaling to probe for an electronic device is a potential source of electromagnetic interference, which could also lead to false alarms.

SUMMARY

In one embodiment, an apparatus is disclosed comprising: a clothes washing machine; a detector attached to the washing machine in a location that receives radio frequency (RF) signals that emanate from an interior of the washing machine; and a warning device that receives a signal from the detector to provide an alert when the detector has detected a RF signal from the interior of the washing machine.

In one embodiment, a method is disclosed comprising: detecting, with a clothes washing machine, the presence of a mobile electronic device inside the washing machine; and notifying, by the washing machine to a user of the washing machine, the presence of the mobile electronic device inside the washing machine so that the mobile electronic device can be removed from the washing machine before washing.

In one embodiment, an apparatus is disclosed comprising: a washing machine; a transceiver attached to the washing machine, the transceiver sending a polling signal to an interior of the washing machine and receiving cell phone signals that emanate from the interior of the washing machine; and a warning device that receives a signal from the transceiver to provide an alert when the transceiver has detected a cell phone signal from the interior of the washing machine.

DETAILED DESCRIPTION OF THE PREFERRED EMBODIMENTS

Figure 1:
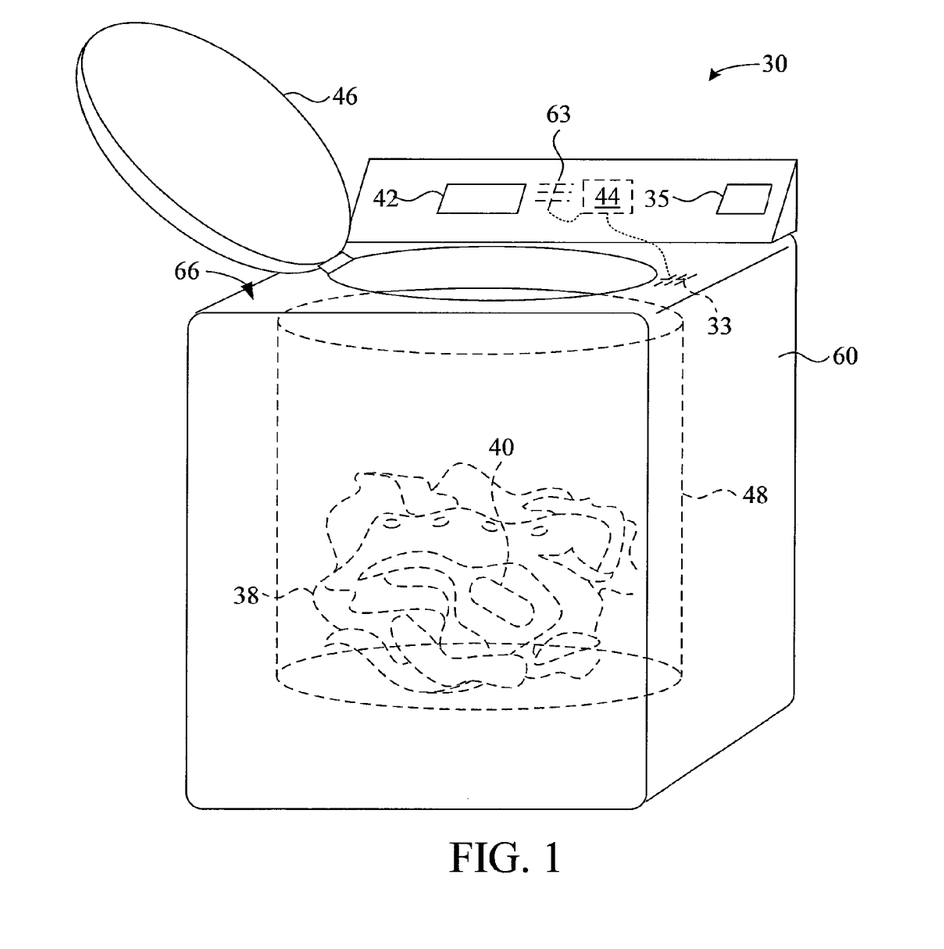
FIG. 1 is a perspective view of a washing machine having a detector and a warning device for alerting a user of the machine to the presence of a cell phone hidden in clothing within the machine.

FIG. 1 shows an exemplary embodiment of a top loading washing machine 30 having an antenna 33 that is coupled to a detector 44 and a warning device 35 for alerting a user of the machine to the presence of a mobile electronic device (MED) 40 such as a cell phone, which is hidden within the machine. A user interface 42 is provided on a top of the washing machine 30, to control the operation of the machine. A door 46 swings open and shut for transferring and washing clothes 38 in a basin 48 of the machine 30. The antenna 33 in this embodiment may be located within a metal housing 60 preferably in sight of an interior of the basin 48. Alternatively, the antenna 33 can be attached to the door 46.

Figure 2:
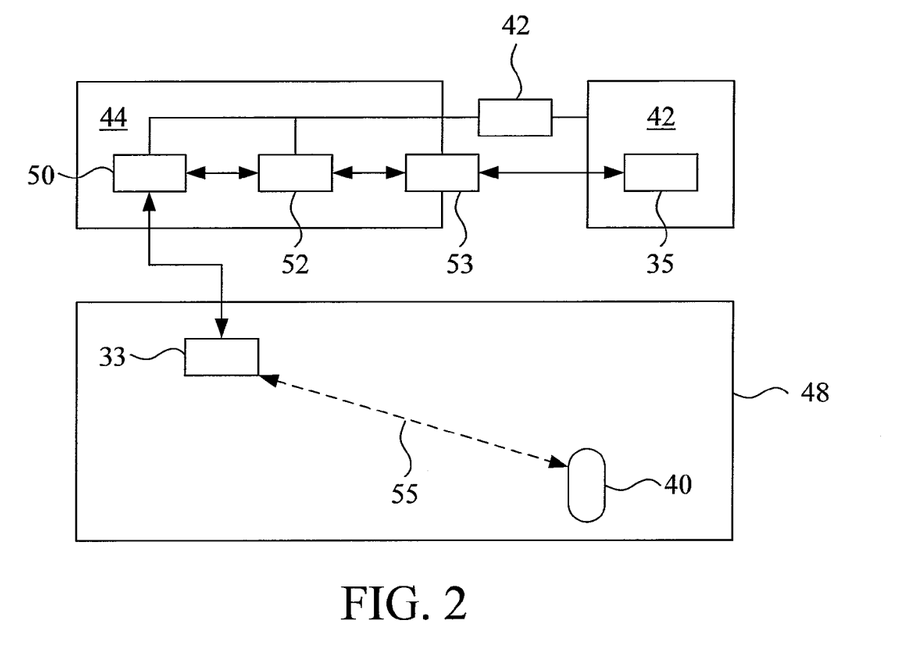
FIG. 2 is a schematic view of an embodiment of the washing machine of FIG. 1, including a detector communicating with the cell phone.

The warning device 35 may provide a visible or audible warning upon detecting a MED 40 inside the washing machine 30, or may simply prevent the washing machine from running until the MED is removed from the washing machine or the device reset. Although shown separately in FIG. 1, the warning device 35 may be part of the user interface 42 as shown in FIG. 2.

Figure 4:
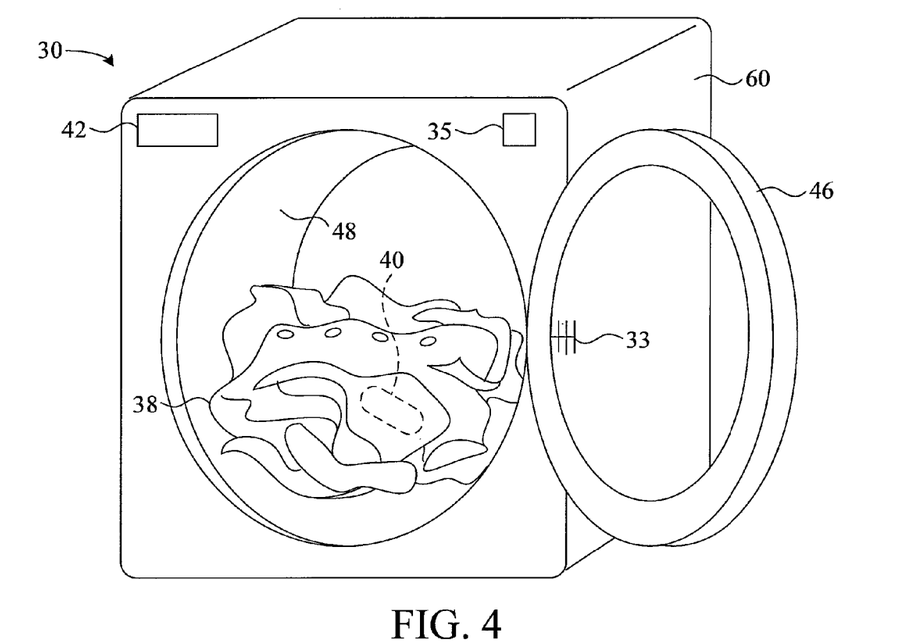
FIG. 4 is a perspective view of a washing machine having a detector and a warning device for alerting a user of the machine to the presence of a cell phone hidden in clothing within the machine.
Figure 5:
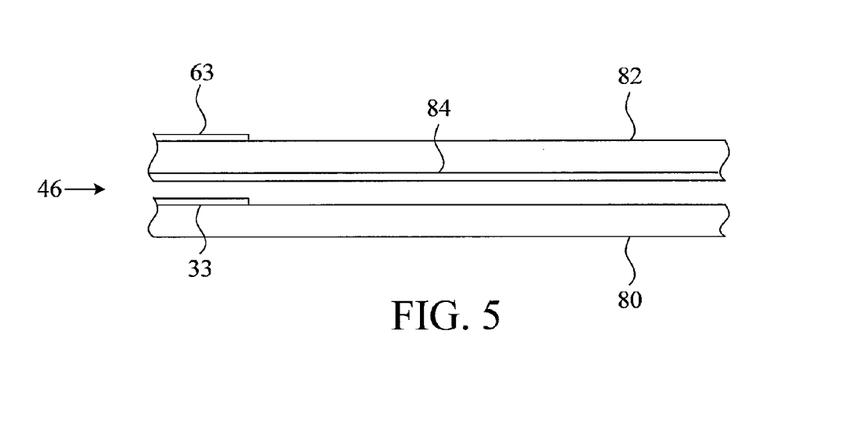
FIG. 5 is an expanded cross-sectional view of a part of a washing machine door that is substantially transparent to light and substantially opaque to RF radiation.

It is important to distinguish between MED 40 signals that emanate from the interior of the washing machine and those that emanate from outside the washing machine. For example, should the detector 44 receive a MED 40 signal from outside the washing machine 30, such as a cell phone held by a user, the detector should not cause the warning device to activate or prevent the machine from washing. The ubiquity of wireless signals, however, makes it difficult to avoid such signals that emanate from outside the washing machine 30. The washing machine 30 and/or the basin 48 may be made of metal, however, which shields the interior somewhat. In addition, closing the metal door 46 in this embodiment provides a further shield, essentially making the inside of the washing machine 30 a Faraday cage. A similar effect can be obtained by forming a metal grid on or in a glass door of a washing machine such as shown in FIG. 4 and FIG. 5 so that the door is transparent to light but opaque to RF radiation. Shutting the glass door with the metal grid can create a Faraday cage for RF radiation inside the washing machine. As discussed further below, it is also possible to distinguish between MED 40 signals that emanate from the interior of the washing machine and those that emanate from outside the washing machine by employing an antenna outside the washing machine as well as one within, and comparing the signals received by the antennas.

Generally, a cell phone mistakenly placed in a washing machine will be in the idle state, and not taking or making a call initiated by a human. A MED in an idle state does not typically transmit signals, in order to conserve power, but that can make detecting a MED in an idle state more difficult. It is less likely for a cell phone to be damaged by water when the phone is turned off, provided it is allowed to dry before being turned on, and so the detection of a phone in a washing machine may not be as important in this state. Prompt detection of a MED in a washing machine is important, because the probability of damage to the cell phone will rise rapidly if it becomes submerged in wash-water. Reducing risk of cell phone damage may be achieved by causing the cell phone to transmit RF radiation on command, so that cell phone RF radiation may be detected quickly. The power and signature of the received RF cell phone radiation may be processed through analog and/or digital circuitry and software to output a probability of detection, which is compared to a threshold. Detections that exceed the threshold may be used to warn the washing machine operator of the likely presence of a cell phone within the washing machine.

A MED may be in one of three states: on, off and idle. While a MED is in an idle state, on but not initiating, receiving, or involved in a telephone call or other communication such as a text message or data transfer, the MED continues receiving one or more signals from base stations. Should the MED change its location, for example by being transported within a car or plane or other object that is moving, it may reach a position at which it receives a stronger signal from another base station than from the base station with which it is registered. At that point the MED will initiate a process of registering with the new base station, sending identifying information such as its telephone number to the new base station. The network then associates the MED with the new base station, and deletes it from the registry of the old base station. Similarly, the loss of signals from the base station or set of base stations with which a MED is registered will prompt the phone to initiate a search for a new base station, in part by transmitting signals within selected RF bands. The signals transmitted by a MED to reregister or send other network control messages can be used to detect a MED that is in a washing machine, as explained below.

In concert with the detection of cell phones or other MEDs that are disposed within a washing machine is the suppression of false detections of phones which are outside the washing machine. False detections can be reduced by deploying the antenna of the detector within the washing machine, and ensuring that the interior of the washing machine has sufficient RF isolation from the outside world. False detections may be further reduced by using a second antenna outside the washing machine and comparing the signals received by the interior and exterior antennas. RF isolation can be achieved by designing the washing machine housing to behave like a Faraday cage around the tub which holds the wash contents. The washing machine housing must be metallic to act like a Faraday cage. A partially see through metal mesh may be embedded in a glass window, if the washing machine has a glass window, to maintain the Faraday cage effect; metal meshes are used extensively in the windows of microwave ovens to protect the users from microwave radiation. Additional suppression of false alarms may be obtained by applying RF absorbing material to areas and gaps in the washing machine housing, which can leak RF radiation into or out of the washing machine enclosure, including gaps between the door and housing.

For a situation in which a cell phone is in an idle mode, placing the MED 40 within an interior of a washing machine having a metal frame and/or metal basin can effectively shield the phone from base station signals. In an idle mode, a cell phone may listen for base station signals and, upon losing contact with the base stations with which it is registered, attempt to reregister with or send other network control messages to local base stations. During that registration or other process, the phone may search for new base stations with various signals within selected RF bands. The detector 44 can listen for signals within those selected frequency bands and, upon receiving a signal of sufficient strength, communicate with the warning device 35 to provide an alert to a user that a cell phone or other MED may be disposed within the washing machine.

The signal that the detector 44 listens for need not match any particular signal pattern but rather can simply be based upon radiation intensity at a given frequency band or set of frequency bands, such that a signal that is received within the selected frequency band(s) and which exceeds a threshold intensity can be interpreted by the detector as an indication that a MED 40 is located within the basin. The geometric positioning of the antenna 33 in a line of sight with most if not all of the interior of basin 48, and the concomitant geometric shielding of the antenna from radiation outside the washing machine, help to distinguish between signals emanating within and without the machine 30, reducing the possibility of false signals. The close proximity of the detector 44 and MED 40 also helps to distinguish between signals within and without the machine 30, and the reflection of electromagnetic radiation within the basin 48 may also intensify a signal that emanates from within the basin.

In one embodiment, a second antenna 63 can be attached to an exterior 66 of the washing machine 30 so that the detector 44 can compare the signals from inside and outside the washing machine. The comparison of signals inside and outside the washing machine, which can be merely intensity and frequency based, can greatly improve the determination of whether a signal is emanating from inside the washing machine. Although the second antenna 63 is shown in FIG. 1 as being in a user interface area of the washing machine to facilitate illustration, the antenna may instead be located outside the metal washing machine frame 60 in another location, such as opposite the first antenna 33, each of which can be separated from the metal frame by an insulating layer.

In one embodiment, an antenna such as antenna 33 can be attached to the door 46. The antenna 33 in this case is electrically isolated from the metal door 46, for example by a layer of insulating material, and an electrical conductor connecting the antenna 33 and the detector 44 can pass through a hinge of the door. Although shielding by the washing machine may be sufficient to initiate RF transmissions by the MED 40, when the door is in a closed position a more complete faraday cage is created inside the washing machine 30, causing a mobile phone disposed in the basin 48 to more certainly lose its base station signals and begin searching for base stations by signaling from inside the washing machine. The second antenna 63 can optionally be located on an outside of the door in one embodiment.

In an embodiment in which the detector or other circuitry connected to the antenna 33 can transmit as well receive signals, a poling signal which is triggered by closing the door 46 can be sent by the antenna, the polling signal causing the MED 40 to reply with a signal that is received by the detector, indicating the presence of a MED 40 within the basin. Such a polling signal can mimic a cell phone base station signal, and can be strong enough to override the list of base station signals with which the phone is registered. In one embodiment the second antenna 63 can receive the local base station signals, which are stored in a memory of detector 44 or other microprocessor so that the microprocessor can transmit signals via the first antenna 33 that cause the phone to respond, thereby revealing its presence within the washing machine.

FIG. 2 shows that the detector 44 in one embodiment includes transmit and receive circuitry 50, a microprocessor 52 and a serial port 53 or other means for communicating with the warning device 35 and user interface 42. A power supply 57 is connected to the detector and user interface. RF signals 55 may be communicated between the MED 40 and the detector 44 via antenna 33 to detect the presence of the MED within the basin 48. A filter or filters may be included to focus on the frequency bands assigned to cell phones or other MEDs, such as cordless phones. The microprocessor 52 may be part of a controller for the washing machine 30, which controls various functions of the machine such as wash settings, and which communicates with a user via the user interface 42. Upon detecting a MED 40 by detector 44, the microprocessor 52 may prevent the machine from providing water to the basin 48, or otherwise interrupt the machine, at least until a user acknowledges and overrides the warning device 35 signal via the user interface 42.

Figure 3:
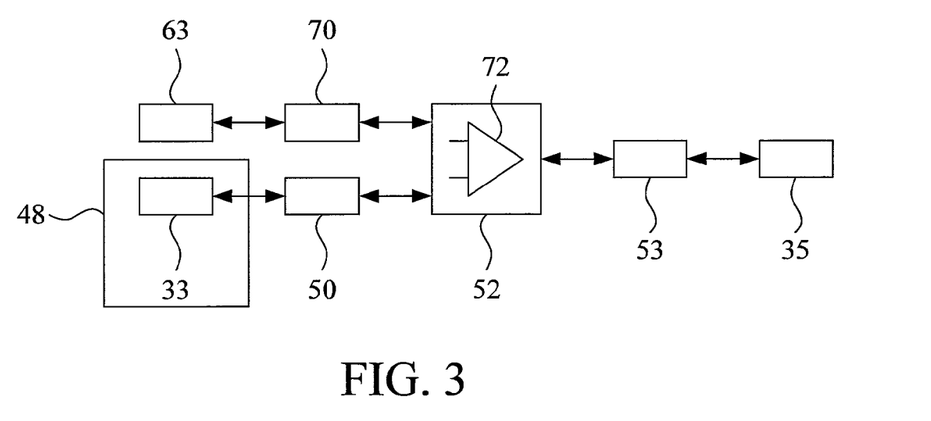
FIG. 3 is a schematic view of an embodiment of the washing machine of FIG. 1, including an antenna disposed inside and a second antenna disposed outside the washing machine.

FIG. 3 shows a schematic diagram of an embodiment that includes the first antenna 33 disposed in the washing machine basin 48 or otherwise positioned to receive RF signals from inside the basin, and the second antenna 63 disposed outside the washing machine basin 48 or otherwise positioned to receive RF signals from outside the basin. The first antenna 33 is coupled to transmit and receive circuitry 50, and the second antenna 63 is coupled to transmit and receive circuitry 70. Signals received by receive circuitries 50 and 70 are output to microprocessor 52, which contains a differential amplifier 72, comparator or other mechanism for comparing at least the intensity of the respective signals to determine whether a signal received by antenna 33 is greater than one received by antenna 63. When such a differential signal is sufficient, which may be adjusted to a different ratio between the signal received by antenna 33 and that received by antenna 63, the microprocessor 52 communicates via port 53 with warning device 35 to output a warning to a user that a MED may be in the washing machine basin 48.

Various comparator circuitries may be used, all comparing signal power or voltage from the external and internal antennas at the same time and within chosen frequency bands. In one embodiment the frequency band is 1.25 MHz in width and selected by the detector 44. In one embodiment the frequency band combines several 1.25 MHz CDMA channels which are selected by the detector 44 and a frequency scanner.

FIG. 4 shows an exemplary embodiment of a washing machine 30 having an antenna 33 that is part of or attached to a detector 44 and a warning device 35 for alerting a user of the machine to the presence of a MED such as a cell phone 40, which is hidden in clothing 38 within the machine. A user interface 42 is provided on a front of the washing machine 30, to control the operation of the machine. A door 46 swings open and shut for transferring and washing clothes in a basin 48 of the machine 30, the door essentially forming a wall of the basin that keeps water in an interior of the machine when shut.

The antenna 33 is attached to the door 44 in this embodiment, and is disposed in a chamber between two glass or plastic plates that form a transparent window in the door. The antenna 33, in concert with the detector 44, is able to receive RF signals from the phone 40. In one embodiment the detector 44 is also able to send RF signals to the phone 40 via the antenna 33, and may be called a transceiver. The antenna 33 may be formed by printing or spraying a conductor such as copper through a mask, for instance, on a surface of the inner glass plate. Alternatively, other types of antennae may be used.

FIG. 5 shows an expanded cross-sectional view of a part of a glass door 46 for a washing machine, the door having an inner glass plate 80 and an outer glass plate 82 that are separated by a gas such as air. A first antenna 33 may be disposed on the inner glass plate 80, for example in the space between the two plates. An inner surface of the outer glass plate 82 may be coated with a metal grid 84 that is substantially transparent to light but substantially opaque to RF signals, similar to that found on doors of conventional microwave ovens, although the grid spacing may be greater for the RF signals involved in the present disclosure. A second antenna 63 may be disposed on an outer surface of the outer glass plate 82, the second antenna 63 shielded from RF signals emanating from inside the washing machine by the grid 84 when the door 46 is closed. The second antenna 63 and/or the grid 84 may be formed by printing or spraying a conductor such as copper through a mask, for instance, on the surfaces of the outer glass plate. The grid 84 also shields the first antenna 33 from RF signals emanating from outside the washing machine when the door 46 is closed. Much as described above, the relative strengths of the RF signals received by the inner antenna 33 and the outer antenna 63 can be compared to aid in the determination of whether a MED 40 is disposed in the washing machine.

In one embodiment, a polling signal may be sent by the detector 44 when the door 46 of the machine is shut. In one embodiment, the detector 44 may actively search for MED signals when the door is shut. As an example, a light switch is conventionally provided for washing machines, which is activated when the door is open. A similar switch can instead be used to detect when the door is shut, triggering a polling signal and/or the active detection. Similarly, a polling signal or initiation of detection can occur when a user interacts with the user interface 42, or immediately prior to a stage in which water or other liquid is added to the basin 48. In one embodiment, the detection system and accompanying active polling is activated while the door is open. In one embodiment, an object detector, such as an optical beam, triggers the detector's polling signal when objects are placed into the washing machine. In one embodiment, the polling signal can be a cell phone base station signal.

Figure 6:
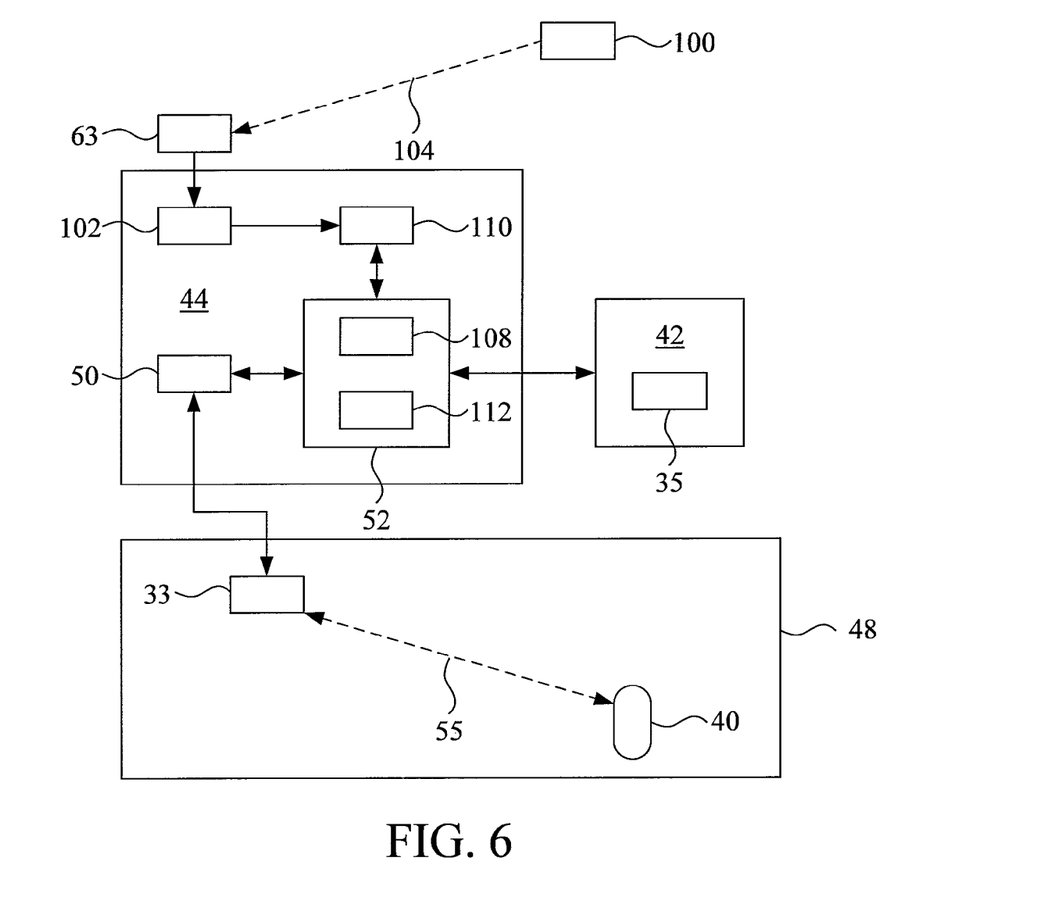
FIG. 6 is a schematic view of a washing machine having a detector that generates base station signals that are transmitted inside the washing machine to prompt a mobile phone within the device to respond and therefore be detected.

In one embodiment, exterior antenna 63 can be connected to the detector 44 for receiving cell phone signals from a base station 100, as shown in FIG. 6, and providing base station signals via antenna 33 to the interior of the basin 48. The detector 44 in this embodiment can receive various base station signals, for example from various subscriber networks, and may transmit different base station signals to the basin 48 interior, to prompt a MED 40 disposed within the basin to respond to one of the different base station signals, generating an alert by warning device 35. In one embodiment, the polling signal is a simulated base station signal, which may be similar to an actual base station signal received at the washing machine, but purposely different in some aspects, as explained below.

In FIG. 6 shows an example of a detector 44 that can command the target phone 40 to actively transmit a detectable RF signal. Various polling techniques may be utilized. For example, code division multiple access (CDMA) phones and similar MEDs can be detected by steps such as the following. First, a list of detectable pilot signals 104 in a detection area of interest is acquired by receiver 102 from local base stations such as base station 100. The receiver may include filters to focus on cell phone frequency bands and a frequency scanner to look at those bands sequentially. The pilot signals are received with the help of a system clock, not shown, which can be used to accurately determine signal offsets. The pilot signals are stored in a memory 110, and referenced by signal generating logic 108, which may include hardware circuits and/or code, and which can generate suitable base station signals to stimulate a response from a MED.

A particular pilot signal or multiple pilot signals can then be transmitted by transceiver 50 and antenna 33, based on the knowledge of the strengths of the respective pilot signals in the area and which pilot(s) will have greatest likelihood of causing an immediate re-registration transmission from the target MED. Should a MED 40 be located inside basin 48 to receive the pilot signal(s) it will respond with a re-registration signal that can be received by antenna 33. Detection logic 112, which may include hardware circuits and/or code, can determine whether a signal meets a threshold intensity level, and/or can decode the signal to determine the presence of MED 40 in basin 48. Optionally, the signal received by antenna 33 can be compared with signals received by antenna 63, as discussed above, to reduce the possibility of false detections. When detection logic 112 detects the presence of MED 40 in basin 48 a signal is sent to warning device 35 to alert a user.

False alarms can be reduced to an acceptable level through a combination of isolating the interior of the washing machine from external RF signals, and setting thresholds appropriately on detection. Transmit power of the detector should also be appropriately chosen to be high enough to cause sufficient field strength within the washing machine enclosure, but low enough so that the signal after attenuation by the washing machine enclosure does not trigger phones external to the washing machine to attempt reregistration.

In one embodiment, the signal from the target MED, is detected without using a decoding operation by the detector 44. The signal-to-noise (SNR) may still be sufficiently high to yield high probability of detection and low false alarm rate, in this case, because the antenna 33 is in close proximity to the target MED 40. In this case, the received signal from the antenna 33 is band pass filtered, and then envelope or square law detected, to yield a signal that may be compared to a detection threshold and may optionally be compared to the received signal detected on the external antenna 63.

Designated frequency bands for mobile telephone systems are well known. For example, some cellular telephone systems transmit at frequencies between 800 and 900 MHz, for instance in a range between 824 MHz and 894 MHz. Other mobile telephone systems may utilize frequencies of approximately 2 GHz (2000 MHz). For example, certain communication systems may utilize frequencies of 1750-1870 MHz. These frequency ranges are only examples, and detector 44 may be configured to use other frequency ranges, whether in use at this time or in the future.

While some details in the examples provided above pertain to CDMA wireless systems, the detection method also applies to MEDs operating on other wireless networks. Currently, the leading Wireless Wide Area Networks (WWANs) and their associated carrier frequencies are as follows:

1) Global System for Mobile Communications (GSM)—900, 1800, 1900 MHz; 2) General Packet Radio Services (CPRS)—900, 1800, 1900 MHz; 3 Code division Multiple Access (CDMA)—800, 900, 1700, 1800, 1900 MHz; and 4) CDMA20001x—450, 800, 1700, 1900, 2100 MHz. Handheld devices operating on WWANS generally transmit at average power levels of 0.6 watts, with peak powers of 1-2 watts. Some WWAN handhelds have power controls and transmit at much lower power levels when operating in the presence of a strong base station signal.

The invention claimed is:

1. An apparatus comprising:
a clothes washing machine;
an antenna that is attached to the washing machine in a location to receive radio frequency signals that emanate from an interior of the washing machine, wherein the antenna is adapted to receive signals having a frequency in a band designated for mobile phone signals;
a detector that is operably coupled to the antenna to detect the radio frequency signals having the frequency in the band designated for mobile phone signals; and
a warning device that is operably coupled to the detector to receive a signal from the detector and provide an alert when the detector has detected a radio frequency signal from the interior of the washing machine;
wherein the radio frequency signals have the frequency in the band designated for mobile phone signals.

2. The apparatus of claim 1, wherein the washing machine has a shield that blocks a mobile phone in the interior from receiving mobile phone signals from outside the washing machine, causing the mobile phone to emanate a signal searching for a pilot band.

3. The apparatus of claim 1, wherein the detector is adapted to receive a signal from a mobile phone searching for a pilot band.

4. The apparatus of claim 1, further comprising a second antenna that is attached to the washing machine in a location to receive radio frequency signals from outside the washing machine.

5. The apparatus of claim 4, wherein the detector compares the radio frequency signals received by the antenna and those received by the second antenna to determine whether to send the signal received by the warning device.

6. The apparatus of claim 1, wherein the radio frequency signal detected by the detector is sent in response to closing a door of the washing machine and thereby isolating the interior from mobile phone base station signals.

7. The apparatus of claim 1, wherein the radio frequency signals are mobile phone signals.

8. The apparatus of claim 1, further comprising a transmitter that is operably coupled to the antenna to send wireless phone frequency signals to the interior of the washing machine.

9. The apparatus of claim 8, wherein the detector and the transmitter are integrated in a transceiver.

10. The apparatus of claim 8, wherein the transmitter sends a signal in response to a door of the washing machine being closed.

11. The apparatus of claim 8, wherein the transmitter sends a signal in response to a user interacting with a user interface of the washing machine.

12. The apparatus of claim 8, wherein the transmitter sends a base station cell phone signal.

13. The apparatus of claim 1, wherein the washing machine is stopped from washing when the detector has detected the radio frequency signal from the interior of the washing machine.

14. The apparatus of claim 1, wherein the antenna is attached to a door of the washing machine.

15. The apparatus of claim 1, wherein a door of the washing machine is substantially transparent to light but substantially opaque to the radio frequency signals.

16. A method comprising:
    detecting, by a clothes washing machine, the presence of a mobile electronic device inside the washing machine, wherein the detecting includes receiving a signal having a frequency in a band designated for mobile phone signals; and
    notifying, by the washing machine to a user of the washing machine, the presence of the mobile electronic device inside the washing machine so that the mobile electronic device can be removed from the washing machine before washing clothes.

17. The method of claim 16, wherein the detecting includes providing an antenna in a location to receive radio frequency signals emanating from an interior of the washing machine.

18. The method of claim 16, wherein the detecting includes providing a second antenna in a location to receive radio frequency signals from outside the washing machine, and comparing the radio frequency signals received by the first and second antennas.

19. The method of claim 16, further comprising shielding a mobile phone disposed in an interior of the washing machine from mobile phone signals, and thereby causing the mobile phone to broadcast a signal searching for a pilot band.

20. The method of claim 16, wherein the detecting includes receiving a signal from a mobile phone searching for a pilot band.

21. The method of claim 16, further comprising closing a door of the washing machine and thereby shielding a mobile phone disposed in an interior of the washing machine from mobile phone signals, such that the mobile phone broadcasts a signal searching for a pilot band.

22. The method of claim 16, further comprising:
    polling, by the washing machine, for the presence of the mobile electronic device inside the washing machine.

23. The method of claim 22, further comprising:
    closing a door of the washing machine, thereby triggering the polling.

24. The method of claim 22, further comprising:
    interfacing with the washing machine by the user, thereby triggering the polling.

25. The method of claim 22, wherein the polling includes sending a base station cell phone signal.

26. The method of claim 22, further comprising:
    stopping the washing machine from washing, when the presence of a mobile electronic device is detected inside the washing machine.

27. A method comprising:
    providing a region within a clothes washing machine that is isolated from ambient radio frequency signals;
    placing a mobile phone within the region and thereby prompting the mobile phone to send a signal searching for a base station;
    detecting, by the clothes washing machine, the signal from the mobile phone; and
    notifying, by the washing machine to a user of the washing machine, the presence of the mobile phone inside the washing machine so that the mobile phone can be removed from the washing machine before washing clothes.

28. The method of claim 27, wherein providing the region within a clothes washing machine that is isolated from radio frequency signals includes creating a Faraday cage.

29. The method of claim 27, wherein providing the region within a clothes washing machine that is isolated from radio frequency signals includes providing a door to the washing machine that is opaque to radio frequency signals, and closing the door.

30. The method of claim 27, wherein providing the region within a clothes washing machine that is isolated from radio frequency signals includes providing a door to the washing machine that is opaque to radio frequency signals but transparent to light, and closing the door.

31. The method of claim 27, wherein the detecting includes providing an antenna that is in a line of sight with the region.

32. The method of claim 27, wherein the detecting includes providing a first antenna that is in a line of sight with the region and a second antenna that is not in a line of sight with the region, and comparing the signals from the antennas.

33. An apparatus comprising:
    a washing machine having a basin for washing clothes;
    a first antenna attached to the washing machine in a location to receive radio frequency signals from the basin;
    a second antenna attached to the washing machine in a location to receive radio frequency signals from outside the washing machine;
    a detector for comparing the radio frequency signals received by the first antenna with the radio frequency signals received by the second antenna.

34. The apparatus of claim 33, further comprising a warning device that receives a signal based upon the comparison of the detector to provide an alert when the detector has detected a radio frequency signal from the interior of the washing machine.

35. The apparatus of claim 33, wherein the washing machine contains a Faraday cage.

36. The apparatus of claim 33, wherein the detector compares the radio frequency signals when a door of the washing machine is closed.

37. The apparatus of claim 33, wherein the first antenna is coupled to a transmitter for transmitting radio frequency signals.

38. The apparatus of claim 33, wherein the radio frequency signals have a frequency in a band designated for mobile phone signals.

39. The apparatus of claim 33, wherein the washing machine has a shield that blocks a mobile phone in the interior from receiving mobile phone signals from outside the washing machine, causing the mobile phone to emanate a signal searching for a pilot band.

40. The apparatus of claim 33, wherein the detector compares the radio frequency signals when a user interfaces with the washing machine.

41. The apparatus of claim 33, wherein the washing machine is stopped from washing when the detector detects that the radio frequency signals received by the first antenna have a greater intensity than those received by the second antenna.

42. The apparatus of claim 33, wherein the first antenna is attached to a door of the washing machine.

43. The apparatus of claim 33, wherein a door of the washing machine is substantially transparent to light but substantially opaque to the radio frequency signals.

\* \* \* \* \*